Oct. 20, 1953  J. F. MARTIN  2,656,025
AUTOMATIC BRAKE RELEASE MECHANISM
Filed Sept. 15, 1952  2 Sheets-Sheet 1

INVENTOR.
JOSEPH F. MARTIN.
BY Edward M. Apple
ATTORNEY.

Oct. 20, 1953 J. F. MARTIN 2,656,025
AUTOMATIC BRAKE RELEASE MECHANISM
Filed Sept. 15, 1952 2 Sheets-Sheet 2
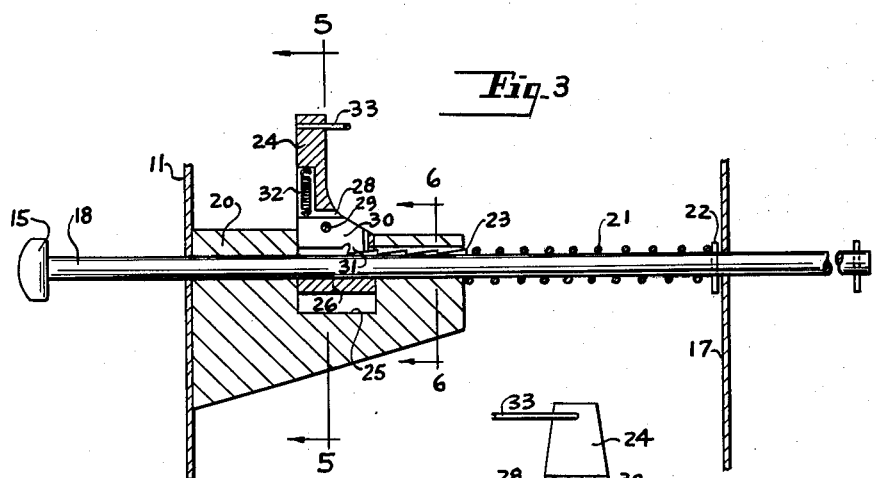
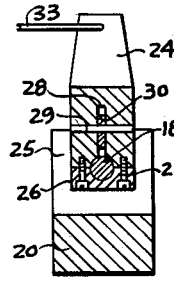
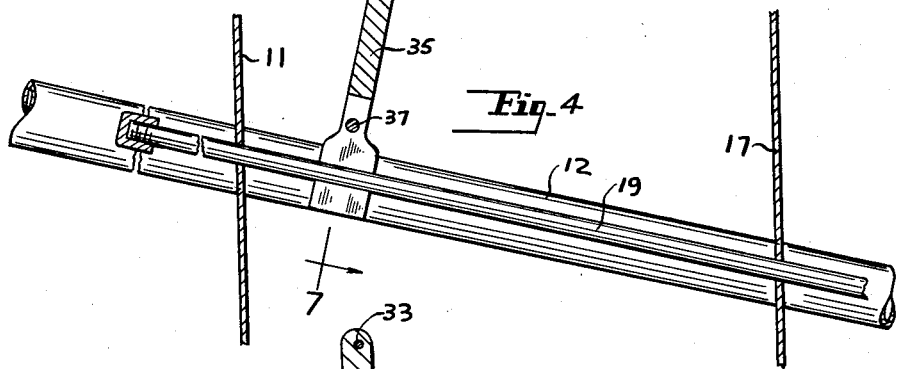
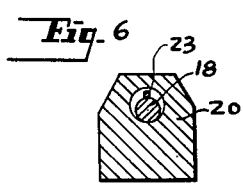
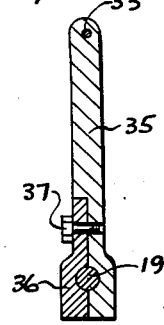
INVENTOR.
JOSEPH F. MARTIN.
BY
Edward M. Apple
ATTORNEY.

Patented Oct. 20, 1953

2,656,025

UNITED STATES PATENT OFFICE 2,656,025

AUTOMATIC BRAKE RELEASE MECHANISM

Joseph F. Martin, Detroit, Mich.

Application September 15, 1952, Serial No. 309,596

5 Claims. (Cl. 192—4)

This invention relates to automotive devices, and has particular reference to a device for automatically releasing the emergency brake of a motor vehicle, so that the danger of driving with the emergency brake on, and thereby burning up the brake bands, is obviated.

An object of the invention is to provide a mechanism, which is readily installed on new or old automotive vehicles, such as are equipped with conventional emergency brake mechanisms, and gear shift levers, or automatic gear selector mechanisms mounted on the steering columns.

I am aware of the fact that mechanisms for automatically releasing the emergency brake of an automobile are known to the public. Such mechanisms heretofore known have related the emergency brake releasing elements to the ball and lever type of gear shift mechanism, but so far as I have been able to ascertain, no one has provided an automatic emergency brake release mechanism which is directly connected to the steering column type of automatic transmission speed selector mechanism, or to the manual gear shift lever mounted on the steering column of many current model vehicles.

In the previously known devices of that character, the releasing of the emergency brake lever depended upon the use of a substantial force which was developed through the leverage of the gear shift lever.

It is therefore an object of the invention to provide an automatic emergency brake release mechanism, which is actuated by the manual operation of selecting a predetermined speed in an automatic transmission mechanism, without the required use of any substantial amount of force, and without in any way interfering with the normal functioning of the automatic transmission.

Another object of the invention is to generally improve devices of the character indicated, and to provide an emergency brake release mechanism which may readily be installed as an accessory on automobiles already in use, or may be installed at the factory, as an integral part of the emergency braking mechanism of the vehicle.

The foregoing and other objects and advantages of the invention will become more apparent as the description proceeds, reference being made from time to time to the accompanying drawing forming part of the within disclosure, in which drawing:

Fig. 3 is a section taken substantially on the line 3—3 of Fig. 2.

Fig. 4 is a section taken substantially on the line 4—4 of Fig. 2.

Fig. 5 is a section taken substantially on the line 5—5 of Fig. 3.

Fig. 6 is a section taken substantially on the line 6—6 of Fig. 3.

Fig. 7 is a section taken substantially on the line 7—7 of Fig. 4.

Figures 1, 2:
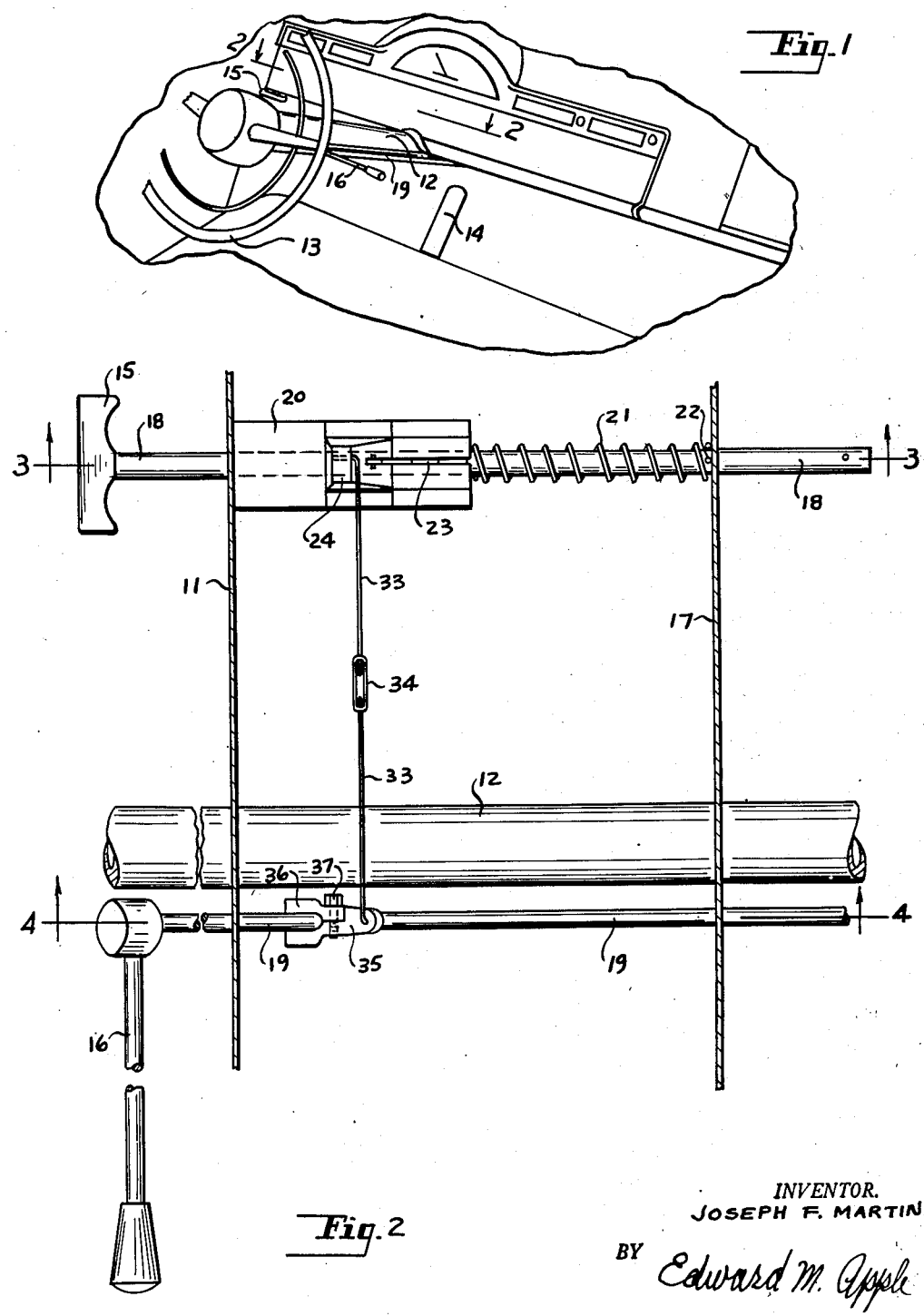
Fig. 1 is a fragmentary view in perspective of the interior of a motor vehicle equipped with a device embodying the invention.
Fig. 2 is a section taken substantially on the line 2—2 of Fig. 1.

Referring now more particularly to the drawing, it will be understood that in the embodiment herein disclosed, the reference character 11 indicates the dash of an automobile, which is equipped with a steering column 12, accelerator pedal 14, emergency brake handle 15, an automatic transmission, speed selector lever 16, and fire wall 17, all of which are conventional parts of a modern day motor vehicle, and form no part of the invention except as they are combined with the elements hereinafter described.

The emergency brake handle 15 is secured to the end of a rod 18, which slidably extends through the dash 11 and the fire wall 17, and serves to actuate the emergency brake mechanism (not shown) through suitable linkage (not shown). The speed selector lever 16 is secured to a rod 19, which is positioned on or along the side of the steering column 12 and extends through the fire wall 17, and in turn is connected by suitable means to the automatic speed mechanism (not shown).

The emergency brake rod 18 is supported by means of a bracket 20, which in turn is secured to the dash 11. The rod 18 is spring loaded by means of a spring 21, which spring is preferably positioned between the bracket 20 and the pin 22. In conventional practice, the rod 18 is provided along its upper edge with a plurality of teeth 23, which are centrally located on the rod and which, when the emergency brake is set, are arranged to engage a dog which is secured to the bracket 20, so that when the rod 18 is rotated about its axis, by means of the handle 15, approximately 90° from the position shown in Fig. 2, the rod 18 under the influence of the spring 21 will return to the normal driving position, which is the position in which it is illustrated in Figs. 2 and 3. With such a construction and arrangement, the driver of the vehicle often times will set the emergency brake, and without releasing it, will start the vehicle motor, select the gears, and start up the vehicle with the emergency brake set, thereby damaging the brake bands and other parts of the emergency brake mechanism. In order to obviate such possibilities, I have devised a simple combination and arrangement of new elements which are applicable to the conventional mechanism heretofore described.

In order to practice my invention, I provide a rocker arm 24, which is pivotally mounted on the rod 18, and is arranged to rock on the rod 18, in a slot 25 formed in the bracket 20. In order to mount the rocker arm 24 on the rod 18, without the necessity of having to remove the rod, I provide a split bearing 26 (Fig. 5) at the bottom of the arm 24, the bearing plate 26 being secured to the lower portion of the rocker arm 24 by means of Allen screws or machine screws 27. The arm 26 has a central slot 28, in which is pivotally mounted, as at 29, a movable dog 30, which dog is provided with an under-cut tooth 31, which is arranged to engage the teeth 23 formed on the rod 18. The dog 30 is spring backed, as at 32, so that the tooth 31 is held in frictional engagement with the teeth 23. In this embodiment, instead of rotating the rod 18 about its longitudinal axis to release the emergency brake mechanism, I prefer to rock the arm 24 in either direction, so that the dog tooth 31 will be out of alignment with the rod teeth 23, thereby freeing the rod 18 so that it may automatically return to the position shown in Figs. 2 and 3, which is the unlocked emergency brake position.

In order to automatically rock the arm 24, I provide a linkage 33, which in this embodiment may consist of a pair of rods joined together by means of a turn buckle 34, although I also contemplate the use of a flexible cable or other means for accomplishing this function. The other end of the linkage 33 is connected to a second arm 35, which is mounted on the speed selector rod 19. The arm 35 is provided with a pressure plate 36, which is secured to the arm by means of a machine screw 37 so that the arm 35 may be held rigidly on the rod 19 so that any rotation of the rod 19 about its longitudinal axis will rock the arm 35, which in turn will rock the arm 24 through the linkage 33.

The arms 24 and 35 are positioned so that when the speed selector lever 16 is in neutral position, the rocker arm 24 carrying the dog 30 will be in position so that the dog 30 will engage the teeth 33 on the rod 18, so that when the speed selector lever 16 is moved in either direction from the neutral position, the rocker arm 24 will be swung out of locking engagement with the emergency brake rod 18, whereby the emergency brake will automatically be released upon any shifting of the speed selector arm 16.

From the foregoing, it will readily be understood that I have provided a simple but efficient automatic means for releasing the emergency brake mechanism upon the shifting of the speed selector mechanism.

Having described my invention, what I claim and desire to secure by Letters Patent is:

1. In a motor vehicle having an emergency brake mechanism including a push-pull rod and a speed selector mechanism including a speed selector lever and rod, the combination of a bracket for supporting said emergency brake rod, an arm rockable on said emergency brake rod, said arm having a spring backed dog thereon arranged to engage teeth formed on said emergency brake rod, an arm rockable with said speed selector rod, and linkage connecting the said arms, whereby upon the rocking of the arm on the speed selector rod in either direction the arm and said dog on said emergency brake rod will be rocked out of engagement with the teeth on said emergency brake rod.

2. The structure defined in claim 1, in which said first named arm is pivotally mounted on said emergency brake rod and is arranged to rock in a slot formed in said bracket, the walls of said slot serving as means for limiting the axial movement of said arm on said rod.

3. The structure defined in claim 1, in which the said second named arm is provided with a pressure plate arranged to contact the speed selector rod, whereby to lock said second named arm securely to said speed selector rod.

4. In an automotive vehicle having an emergency brake rod and a speed selector rod, the combination of a bracket for supporting said emergency brake rod, a rocker arm pivoted on said emergency brake rod, means for preventing the axial movement of said arm on said rod, a spring backed dog carried by said rocker arm and arranged to engage teeth formed on one side of said emergency brake rod, a second arm secured to said speed selector rod and shiftable therewith, and adjustable linkage connecting said arms.

5. In combination with an automotive vehicle having emergency brake mechanisms including a manually shiftable rod, a plurality of teeth on said rod, a bracket for supporting said rod, a rocker arm pivotally mounted on said rod, a spring backed dog carried by said rocker arm and alignable with the teeth on said rod, a speed selector mechanism including a control rod, an arm fixed to said control rod, adjustable linkage connecting both of said arms, whereby upon the movement of said speed selector control rod in either direction, said spring backed dog on said first named rocker arm will be moved out of alignment with said teeth and said emergency brake rod.

JOSEPH F. MARTIN

No references cited